(12) United States Patent
Yamashita (10) Patent No.: US 7,858,169 B2
(45) Date of Patent: Dec. 28, 2010

(54) HONEYCOMB SEGMENT

(75) Inventor: Masataka Yamashita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/509,123

(22) Filed: Jul. 24, 2009

(65) Prior Publication Data

US 2009/0286042 A1   Nov. 19, 2009

Related U.S. Application Data

(63) Continuation of application No. PCT/JP2008/052130, filed on Feb. 8, 2008.

(30) Foreign Application Priority Data

Mar. 29, 2007   (JP) .............................. 2007-089699

(51) Int. Cl.
*B32B 3/12* (2006.01)
(52) U.S. Cl. .................................................... 428/116
(58) Field of Classification Search ................ None
See application file for complete search history.

(56) References Cited

U.S. PATENT DOCUMENTS

2005/0076627 A1* 4/2005 Itou et al. ..................... 55/523

2005/0191461 A1   9/2005  Kasai et al.
2006/0068159 A1   3/2006  Komori et al.

FOREIGN PATENT DOCUMENTS

| FR | 2 789 327 A1 | 8/2000 |
| JP | A 2001-334114 | 12/2001 |
| JP | A 2005-270969 | 10/2005 |
| WO | WO 2004/113252 A1 | 12/2004 |

\* cited by examiner

*Primary Examiner*—Gordon R Baldwin
(74) *Attorney, Agent, or Firm*—Oliff & Berridge, PLC (57) ABSTRACT

A honeycomb segment containing outer walls and porous partition walls disposed inside the outer walls has a structure where first cells each open in one end portion on one side and plugged in the other end portion on the other side and second cells each plugged in one end portion on one side and open in the other end portion on the other side are alternately disposed, a cross-sectional area of the first cells in a cross section cut along a plane perpendicular to a longitudinal direction of the cells is larger than that of the second cells, and the first cells and the second cells are alternately disposed in a first direction and in a second direction perpendicular to the first direction in the cross section, and the outer walls are linearly formed so as to have a uniform thickness except for corner portions.

4 Claims, 7 Drawing Sheets

Type A

Type A

Type B

FIG.5

Type C

FIG.6

Type D

HONEYCOMB SEGMENT

TECHNICAL FIELD

The present invention relates to a honeycomb segment. More specifically, the present invention relates to a honeycomb segment capable of inhibiting clogging by particulate matter or the like on the end face on the fluid inflow side and maintaining high strength.

BACKGROUND ART

In consideration of influences on the environment, there is an increased need for removing particulate matter and harmful substances in exhaust gas from an internal combustion engine, a boiler, and the like. In particular, regulations regarding removal of particulate matter (hereinafter referred to from time to time as "PM") discharged from a diesel engine tends to be strengthened on a global basis, and use of a honeycomb filter is attracting attention as a trapping filter (hereinafter referred to from time to time as a "DPF") for removing PM, and various kinds of systems have been proposed. In the aforementioned DPF, generally a plurality of cells functioning as fluid passages and each having a quadrangular cross-sectional shape are separated and formed by porous partition walls, and the cells are alternately plugged in such a manner that the porous partition walls constituting the cells function as a filter. Here, the cross-sectional shape means a shape of a cross section cut along a plane perpendicular to the longitudinal direction of the cells.

The DPF allows the exhaust gas or the like containing particulate matter to flow therein from one end portion side and, after the particulate matter is filtrated by the partition walls, discharges purified exhaust gas from the other end portion side. The DPF has a problem of deposition of the particulate matter contained in the exhaust gas in the one end portion (end portion on the exhaust gas inflow side) in accordance with inflow of the exhaust gas to clog cells. This is a phenomenon easily caused in the case that a large amount of particulate matter is contained and in cold climates. Such clogging of cells causes rapid increase in pressure loss in the DPF. In order to inhibit such clogging of cells, there has been proposed a structure where a cross-sectional area of the cells each having an open end portion on the aforementioned gas inflow side (inflow side cell) is different from that of the cells each having an open end portion on the aforementioned other side (outflow side cell). Here, the cross-sectional area means an area of a cross section cut along a plane perpendicular to the longitudinal direction of the cells.

However, when the cross-sectional area of the inflow side cells is made different from that of the outflow side cells of the honeycomb filter having the cells having a quadrangular cross-sectional shape, the thickness of the partition walls forming the cells becomes thin in a part of a portion where the partition walls cross each other (hereinafter referred to from time to time as an "intersection portion") to decrease strength. Therefore, when PM is combusted and removed by performing post injection when PM has deposited in the DPF, thermal stress concentrates in a part of the thin intersection portion to easily cause breakage. Here, the portion where the partition wall cross each other means a portion belonging to both the partition walls crossing each other in a cross section cut along a plane perpendicular to the longitudinal direction of the honeycomb filter. For example, in the aforementioned cross section, when the partition walls linearly extending and having the same thickness cross each other, the intersection portion means the square range where the partition walls cross each other.

In addition, there has been proposed a honeycomb filter having the inflow side cells having a larger cross-sectional area and outflow side cells having a smaller cross-sectional area, where the each of cells having a larger cross-sectional area has an octagonal cross-sectional shape obtained by linearly cutting the corners of a square (see, e.g., Patent Document 1).

By the octagonal cross-sectional shape of the cells, the partially thin state of the intersection portion is slightly reduced. However, the problem of low strength against thermal stress still remains. Therefore, there is desired a honeycomb filter where both the problem of clogging of the cells and the problem of low strength are solved.

Patent Document 1: French Patent Application Laid-Open No. 2789327 Specification

DISCLOSURE OF THE INVENTION

The present invention aims to provide a honeycomb segment having an effect in improving bonding strength and alleviating thermal stress caused upon soot combustion by inhibiting clogging of cells to improve trapping performance and by linearly forming the outer walls to have a uniform thickness.

It has been found out that the aforementioned problems can be solved by linearly forming the outer walls so as to have a uniform thickness except for the corner portions. That is, according to the present invention, the following honeycomb segment is provided.

[1] A honeycomb segment comprising outer walls and porous partition walls disposed inside the outer walls and separating and forming a plurality of cells functioning as fluid passages, the honeycomb segment having a structure where first cells each open in one end portion on one side and plugged in the other end portion on the other side and second cells each plugged in one end portion on one side and open in the other end portion on the other side are alternately disposed in such a manner that the fluid flowing in the first cells from the one end portion is permeated through the partition walls to flow out inside the second cells as a permeated fluid and that the permeated fluid can be discharged from the other end portion on the other side where the second cells are open; wherein a cross-sectional area of the first cells in a cross section cut along a plane perpendicular to a longitudinal direction of the cells is larger than that of the second cells, and the first cells and the second cells are alternately disposed in a first direction and in a second direction perpendicular to the first direction in the cross section, and the outer walls are linearly formed so as to have a uniform thickness except for corner portions.

[2] The honeycomb segment according [1], wherein a cell structure formed by the first cells and the second cells in an outermost peripheral portion is formed different from that in a central portion.

[3] The honeycomb segment according to [2], wherein the first cells in the outermost peripheral portion are formed smaller than the first cells in the central portion.

[4] The honeycomb segment according to [2], wherein the second cells in the outermost peripheral portion are formed larger than the second cells in the central portion.

[5] The honeycomb segment according to any one of [1] to [4], wherein a thickness of the outer wall is within ±15% of a standard thickness except for the corner portions.

[6] The honeycomb segment according to any one of [1] to [5], wherein a cross-sectional shape of inner peripheral faces of the outer walls in the cross section cut along the plane perpendicular to the longitudinal direction of the cells is square.

By linearly forming the outer walls having a uniform thickness, flowability of the material for the outer peripheral portion upon forming a segment becomes uniform to reduce a variance in porosity and pore size of the outer walls. This enables to obtain a uniform anchor effect of the bonding material upon bonding honeycomb segments, thereby improving bonding strength. In addition, by linearly forming the outer walls having a uniform thickness, the bonding width of the bonding material layer upon bonding honeycomb segments becomes constant to reduce a variance in pressure loss and a variance in a thermal stress absorption effect by the bonding material. In addition, a crack inhibition effect can be improved against local thermal stress caused upon soot combustion.

DESCRIPTION OF REFERENCE NUMERALS

1: honeycomb filter, 2: honeycomb segment, 3: outer wall, 3s: inner peripheral face (of outer wall), 4: outer peripheral coat layer, 5: cell, 5a: first cell (large cell), 5b: second cell (small cell), 5c: third cell (transformed cell of the first cell), 5d: third cell (transformed cell of the second cell), 5e: third cell (transformed cell of the second cell), 6: partition wall, 7: filler, 9: bonding material layer

BEST MODE FOR CARRYING OUT THE INVENTION

Hereinafter, embodiments of the present invention will be described with referring to drawings. The present invention is by no means limited to the following embodiments, and changes, modifications, and improvements may be made as long as they do not deviate from the scope of the invention.

Figure 1:
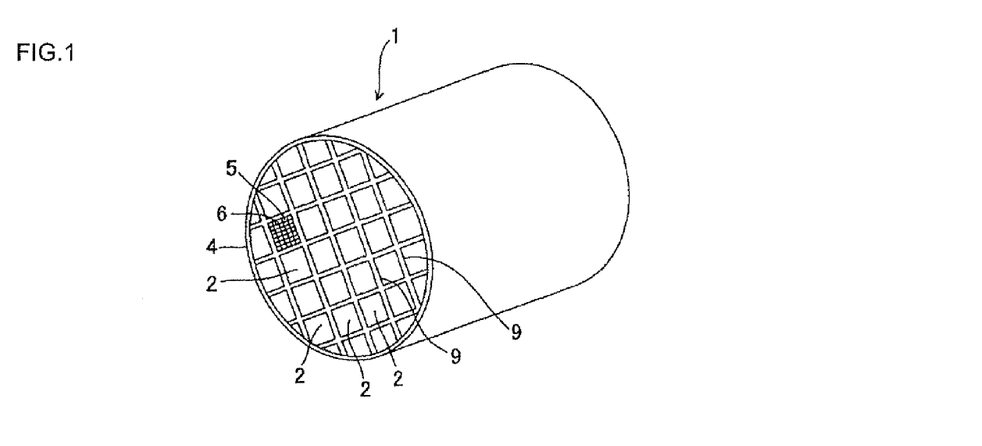
FIG. 1 is a perspective view schematically showing an embodiment of a honeycomb filter of the present invention.
Figure 2:
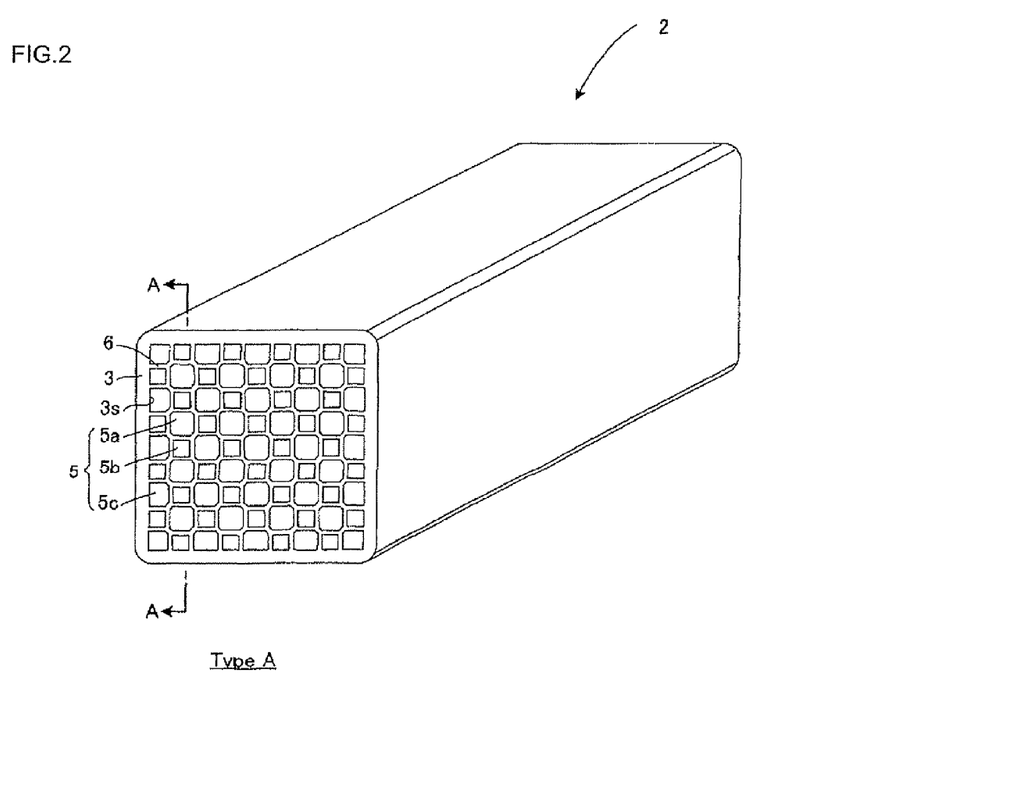
FIG. 2 is a perspective view schematically showing Type A of the honeycomb segment used for the honeycomb filter of the present invention.
Figure 3:
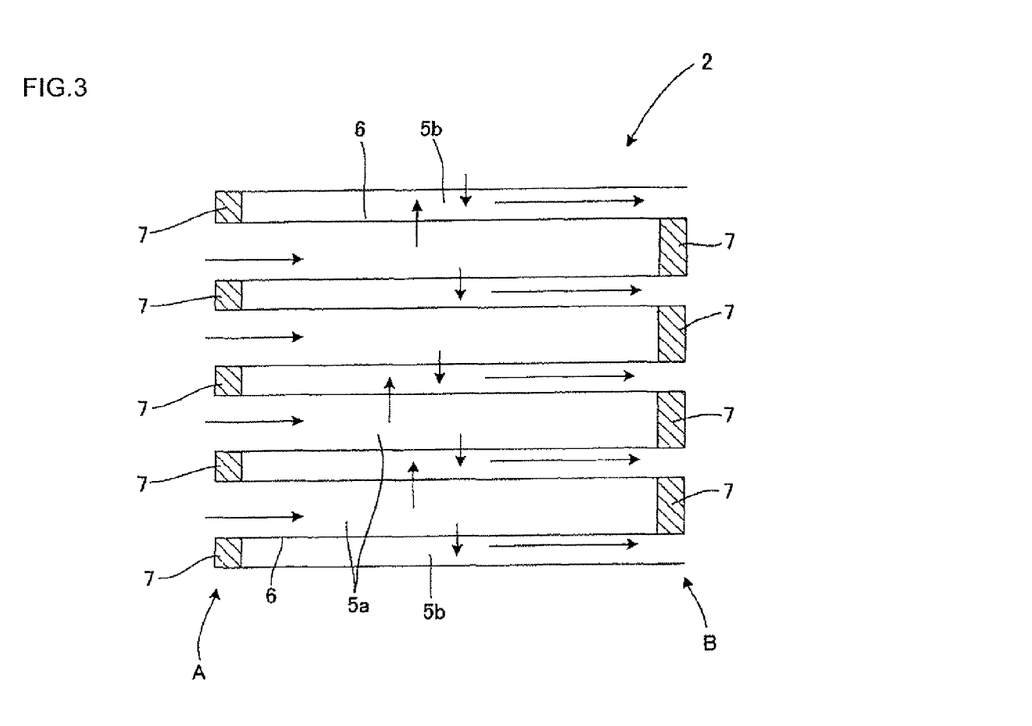
FIG. 3 is an A-A cross-sectional view in FIG. 2.

FIG. 1 is a perspective view schematically showing a honeycomb filter 1. FIG. 2 is a perspective view showing a honeycomb segment 2 (Type A) of the present invention constituting the honeycomb filter 1 of FIG. 1. Further, FIG. 3 is an A-A cross-sectional view of the honeycomb segment 2 of FIG. 2.

Here, as shown in FIGS. 1 and 2, the honeycomb segment 2 of the present invention has a shape constituting a part of the whole structure of the honeycomb filter 1 (honeycomb segment bonded article) and constitutes the honeycomb filter 1 by being combined in the direction perpendicular to the central axis (longitudinal direction) of the honeycomb filter 1. Cells 5 are disposed in parallel with one another in the central axial direction of the honeycomb filter 1 and alternately plugged with a filler 7 in end portions in the adjacent cells 5 (see FIG. 3).

More specifically, the honeycomb segment 2 is formed into a columnar shape having a quadrangular cross section and provided with the outer walls 3 and the porous partition walls 6 separating and forming a plurality of cells 5 functioning as fluid passages. Two kinds of cells 5a and 5b having different cross-sectional area in a cross section cut along a plane perpendicular to the longitudinal direction of the cells 5 are formed, and transformed cells 5c of the cells 5a are further formed. The first cells (large cells) 5a have a larger cross-sectional area in a cross section cut along a plane perpendicular to the longitudinal direction of the cells than that of the second cells (small cells) 5b and are formed into an octagonal shape where the portions corresponding with the corner portions are cut off or a quadrangular shape where the portions corresponding with the corner portions are arc-shaped. Here, the corner portion means a vertex in the case that the cross sectional shape is supposed to be a corresponding polygon (polygon formed by extending the linear portions) and a portion corresponding to the periphery of the vertex. The third cells 5c as transformed cells of the first cells 5a are formed to have a shorter cell width than the first cells 5a and formed in the outermost peripheral portion in contact with the outer peripheral walls 3.

The first cells 5a and the second cells 5b are alternately disposed in the first direction and the second direction perpendicular to the first direction in a cross section cut along a plane perpendicular to the longitudinal direction of the cells. In addition, the outer walls are linearly formed so as to have a uniform thickness. The cell structure formed by the first cells 5a and the second cells 5b in the outermost peripheral portion are formed differently from the cell structure of the central portion. Specifically, the third cell 5c (That is, the third cell 5c is a transformed cell of the first cell 5a and hereinafter explained from time to time as being included in the first cells 5a.) smaller than the first cell 5a in the central portion is formed in the position where the first cell 5a is disposed of the outermost peripheral portion. In the outermost peripheral portion, the second cells 5b and the third cells 5c are alternately disposed. Since the third cells 5c are transformed cells of the first cells 5a, it can be said that the small first cells 5a and the second cells 5b are disposed in the outermost peripheral portion. By thus disposing the second cells 5b and the third cells 5c in the outermost peripheral portion, the inner peripheral faces 3s of the outer walls 3 are linearly formed and formed into a quadrangular shape in a cross section cut along a cross section perpendicular to the longitudinal direction of the cells. It is preferable that the outer walls 3 are formed to have a uniform thickness with almost no unevenness, specifically, within ±15% of the standard thickness except for the corner portions.

As shown in a cross-sectional view schematically showing in FIG. 3, the first cells 5a (including the third cells 5c) open in the end portion A on one side and plugged in the other end portion B on the other side and the second cells 5b plugged in the end portion A on one side and open in the other end portion B on the other side are alternately disposed to have a structure where the fluid flowing in from the end portion A on one side where the first cells 5a are open is passed through the partition walls 6 and allowed to flow out into the second cells 5b as a permeated fluid, which is discharged from the other end portion B where the second cells 5b are open.

Thus, according to the honeycomb filter 1 of the present embodiment, by making the cross-sectional area of the first cell 5a different from that of the second cell 5b (the cross-sectional area of the first cell 5a is larger than that of the second cell 5b) and allowing a fluid to flow in from an end portion (end portion on one side) A on the side where the first cells 5a are open (The first cells 5a each having a larger cross-sectional area function as inflow side cells.), when exhaust gas containing particulate matter is sent into the honeycomb filter 1, the first cells 5a open in the end portion (end portion on the inflow side) A on one side can be inhibited from clogging. Further, by disposing the third cells 5c obtained by making the first cells 5a smaller in the outermost peripheral portion together with the second cells 5b, the outer walls 3 are linearly formed so as to have a uniform thickness except for the corner portions, and high strength can be maintained.

As a material for the honeycomb segment 2, there is preferably used at least one kind selected from the group consisting of silicon carbide, silicon-silicon carbide based composite material, silicon nitride, cordierite, mullite, alumina, spinel, silicon carbide-cordierite based composite material, silicon-silicon carbide composite material, lithium aluminum silicate, aluminum titanate, and Fe—Cr—Al based metal from the viewpoints of strength and thermal resistance. Of these, silicon carbide or silicon-silicon carbide composite material is preferable.

The honeycomb segment 2 can be produced by, for example, adding a binder such as methyl cellulose, hydroxypropoxyl cellulose, hydroxyethyl cellulose, carboxymethyl cellulose, and polyvinyl alcohol, a surfactant, water as a solvent, and the like to a material suitably selected from the aforementioned materials to obtain kneaded clay having plasticity; subjecting the kneaded clay to extrusion forming into the aforementioned shape; drying the kneaded clay by microwaves, hot air, or the like; and sintering the kneaded clay.

As the filler 7 used for plugging the cells 5, a material similar to that for the honeycomb segment 2 can be used. The plugging with the filler 7 can be performed by immersing an end face of the honeycomb segment 2 in the slurried filler 7 in the state that the cells 5 to be unplugged in the end face is masked to fill the filler 7 into the open cells 5. Though the filling of the filler 7 may be performed after formation of the honeycomb segment 2 and before firing or after firing, it is preferably performed before firing because only one firing step is required.

After manufacturing honeycomb segments 2 as described above, a slurried bonding material layer 9 is applied on the outer peripheral faces of the honeycomb segments 2, the honeycomb segments 2 are combined to give a predetermined solid shape (whole structure of the honeycomb filter 1), pressure is applied for bonding in this combined state, and the structure is dried by heating. Thus, a bonded article where a plurality of honeycomb segments 2 are unitarily bonded together is manufactured.

Suitable examples of the material for the bonding material layer 9 used for the present invention include materials constituted of inorganic fibers, an inorganic binder, an organic binder, and inorganic particles. Specifically, examples of the inorganic fibers include oxide fibers of aluminosilicate, alumina, or the like, and other fibers (e.g., SiC fibers). Examples of the inorganic binder include silica sol, alumina sol, and clay. Examples of the organic binder include polyvinyl alcohol (PVA), carboxymethyl cellulose (CMC), and methyl cellulose (MC). Examples of the inorganic particles include ceramics such as silicon carbide, silicon nitride, cordierite, alumina, and mullite.

For example, as shown in FIG. 1, the honeycomb filter 1 obtained in the present invention is provided with a honeycomb segment bonded article where a plurality of honeycomb segments 2 are unitarily bonded together at bonding faces via the bonding material layer and an outer peripheral coat layer 4 for covering the outer peripheral face of the honeycomb segment bonded article and has a structure where a plurality of cells 5 functioning as fluid passages are disposed in parallel with one another in the central axial direction.

The outer peripheral coat layer 4 is applied on the outer peripheral face of the bonded article of the honeycomb segments 2 and functions so as to protect the outer peripheral face of the bonded article of the honeycomb segments 2. The thickness of the outer peripheral coat layer 4 is suitably selected from the range of, for example, 0.1 to 1.5 mm.

In the honeycomb filter 1 formed as described above, the first cells (inflow cells) 5a are open on the left end portion side and plugged with the filler 7 on the right end portion side as shown in FIG. 3, while the other cells (outflow cells) 5b adjacent to the first cells are plugged with the filler 7 on the left end portion side and open on the right end portion side. By such plugging, each end face of the honeycomb segment 2 shows a checkerwise pattern. In the case of disposing the honeycomb filter 1 where such honeycomb segments 2 are bonded together in an exhaust gas system for exhaust gas, exhaust gas flows into the cells 5 of each honeycomb segment 2 from the left side and moves toward the right side. When the exhaust gas passes through the partition walls 6, particulate matter (particulates) including soot in the exhaust gas is trapped by the partition walls 6. Thus, exhaust gas can be purified. Since pressure loss increases due to deposition of particulate matter (particulates) including soot with the passage of time inside the honeycomb segment 2, regeneration by combustion of the soot and the like is performed.

By making the inlet cells (larger cells, i.e., the first cells 5a) in the outermost peripheral portion small in such a manner that the outer walls 3 are made linear and have a uniform thickness as the type A shown in FIG. 2, the soot deposition amount in the outer peripheral portion where the gas flow is bad can be decreased, and a larger amount of soot can be deposited in the central portion where the gas flow is good. As the result, the regeneration efficiency can be improved. Since the outer walls 3 are linear and have a uniform thickness, the bonding width of the bonding material layer 9 upon bonding honeycomb segments 2 becomes constant to reduce a variance in pressure loss and a variance in a thermal stress absorption effect against local thermal stress caused upon soot combustion.

Incidentally, though the first cells 5a in the aforementioned embodiment have an octagonal shape where the portions corresponding with the corner portions are cut off, they may be formed into a quadrangular shape where the portions corresponding to the corner portions are arc-shaped.

Figure 4:
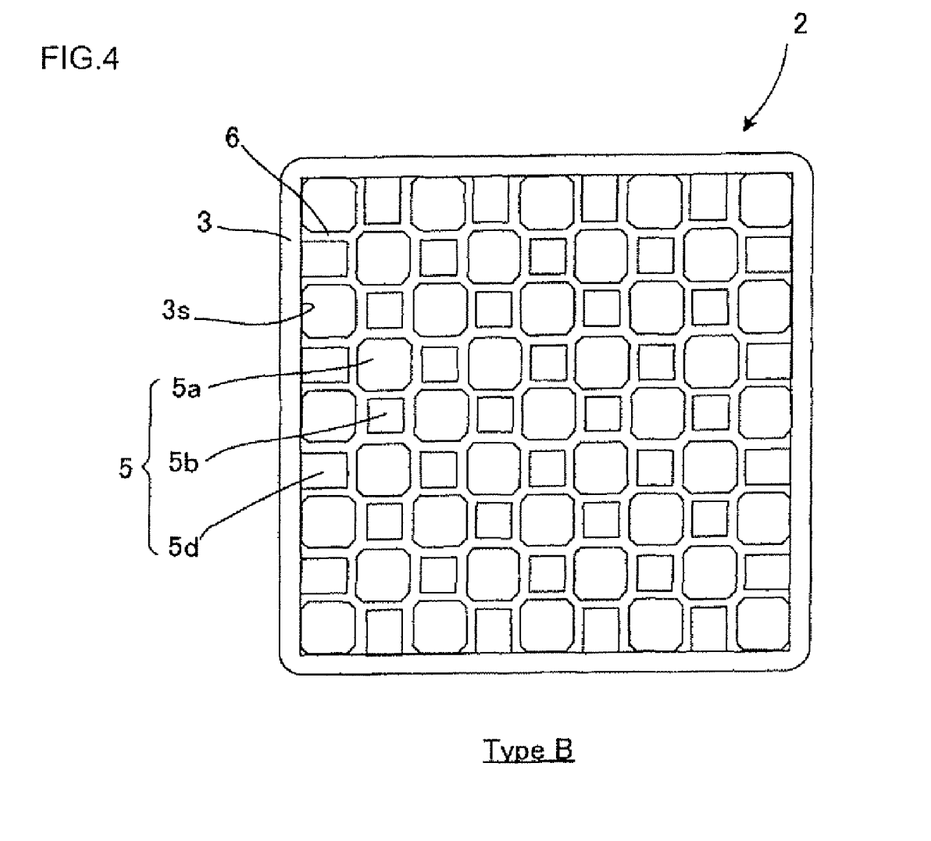
FIG. 4 is a view showing Type B of the honeycomb segment of the present invention.

Next, another embodiment (Type B) will be described using FIG. 4. In the honeycomb segment 2 of FIG. 4, the second cells in the outer peripheral portion are formed to be larger than the second cells 5b in the central portion. The third cells 5d of the present embodiment are transformed cells of the second cells 5b and obtained by elongating the cell width of the second cells 5b to be formed in the outer peripheral portion in contact with the outer walls 3.

The third cells 5d larger than the second cells 5b in the central portion are formed in the positions where the second cells 5b are disposed of the outermost peripheral portion, and the first cells 5a and the third cells 5d are alternately disposed in the outermost peripheral portion. By thus disposing the first cells 5a and the third cells 5d in the outermost peripheral portion, the inner peripheral faces 3s of the outer walls 3 are linearly formed and formed into a quadrangular shape in a cross section cut along a plane perpendicular to the longitudinal direction of the cells. The outer walls 3 are preferably formed to have a uniform thickness with almost no unevenness, specifically, within ±15% of the standard thickness except for the corner portions.

By enlarging the outlet cells (small cells, i.e., the second cells 5b) in the outermost periphery with linearly forming the outer walls 3 so as to have a uniform thickness as the Type B, the gas flow is improved in the outer peripheral portion where the gas flow is bad to reduce pressure loss. Since the outer walls 3 are linear and have a uniform thickness, the bonding width of the bonding material layer 9 upon bonding honeycomb segments 2 becomes constant to reduce a variance in pressure loss and a variance in a thermal stress absorption effect against local thermal stress caused upon soot combustion.

Figure 5:
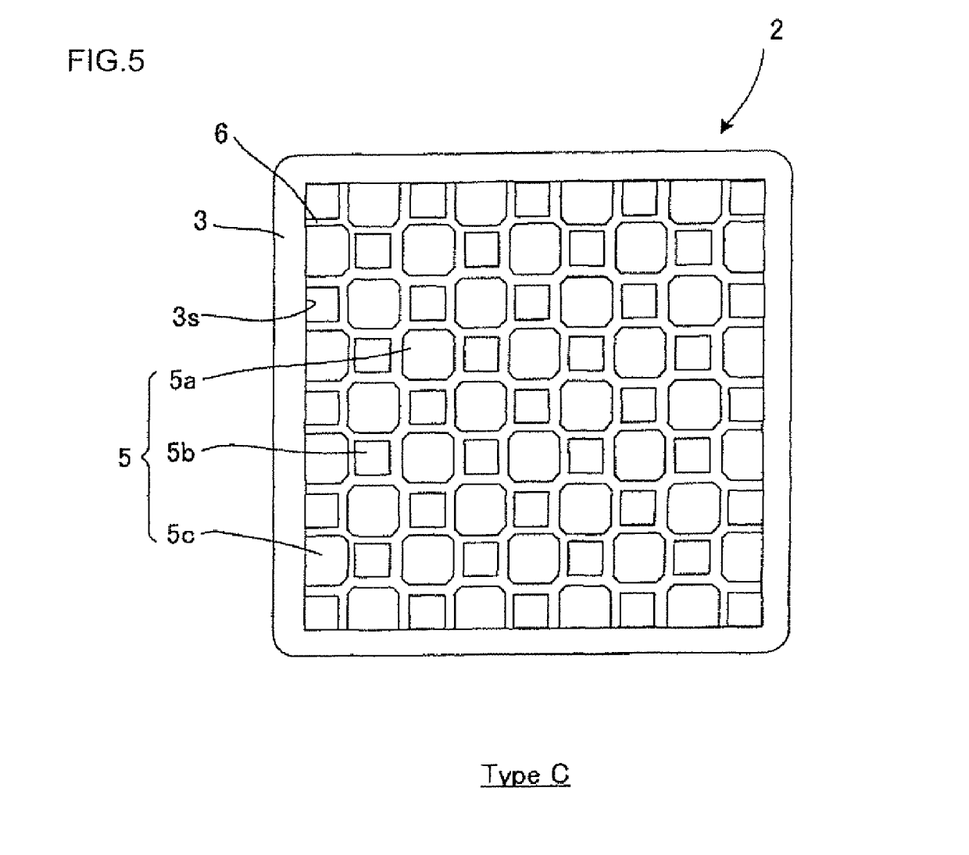
FIG. 5 is a view showing Type C of the honeycomb segment of the present invention.

Next, another embodiment (Type C) will be described using FIG. 5. In the present embodiment, like the Type A, the third cells 5c as the transformed cells of the first cells 5a are formed by shortening the cell width of the first cells 5a in the outermost peripheral portion in contact with the outer walls 3. The third cells 5c smaller than the first cells 5a in the central portion are formed in the positions where the first cells 5a are disposed of the outermost peripheral portion. In the outermost peripheral portion, the second cells 5b and the third cells 5c are alternately disposed. Unlike the Type A, the second cells 5b as the small cells are disposed in the corner portions of the outermost peripheral portion. By thus disposing the second cells 5b and the third cells 5c in the outermost peripheral portion, the inner peripheral faces 3s of the outer walls 3 are linearly formed and formed into a quadrangular shape in a cross section cut along a plane perpendicular to the longitudinal direction of the cells.

By making the inlet cells (large cells, i.e., the first cells 5a) in the outermost periphery small by linearly forming the outer walls 3 so as to have a uniform thickness like the Type C, the soot deposition amount in the outer peripheral portion where the gas flow is bad can be decreased, and a larger amount of soot can be deposited in the central portion where the gas flow is good. As the result, the regeneration efficiency can be improved. Since the outer walls 3 are linear and have a uniform thickness, the bonding width of the bonding material layer 9 upon bonding honeycomb segments 2 becomes constant to reduce a variance in pressure loss and a variance in a thermal stress absorption effect against local thermal stress caused upon soot combustion.

Figure 6:
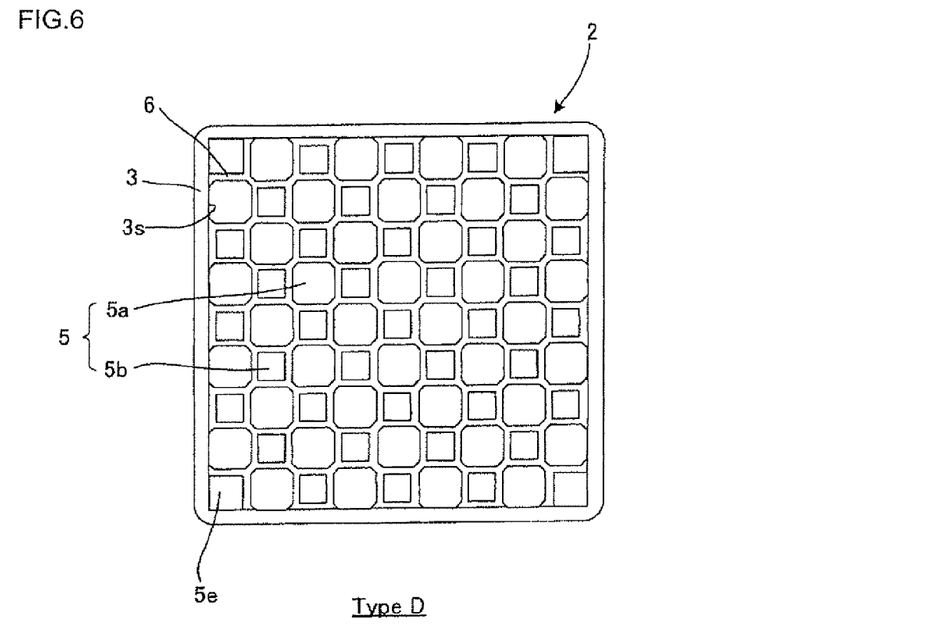
FIG. 6 is a view showing Type D of the honeycomb segment of the present invention.

Next, another embodiment (Type D) will be described using FIG. 6. In the honeycomb segment of FIG. 6, the first cells 5a and the second cells 5b disposed in the side portions of the outermost peripheral portion have the same sizes as the first cells 5a and the second cells 5b in the central portion. However, the second cells 5b disposed in the corner portions in the outermost peripheral portion are enlarged to be the third cells 5e. The inner peripheral faces 3s or the outer walls 3 are linearly formed and formed into a quadrangular shape in a cross section cut along a plane perpendicular to the longitudinal direction of the cells.

By enlarging the corner portions of the outlet cells (small cells, i.e., the second cells 5b) in the outermost periphery with the outer walls 3 having a uniform thickness as the Type D, the gas flow is improved in the outer peripheral portion where the gas flow is bad to reduce pressure loss. Since the outer walls 3 are linear and have a uniform thickness, the bonding width of the bonding material layer 9 upon bonding honeycomb segments 2 becomes constant to reduce a variance in pressure loss and a variance in a thermal stress absorption effect against local thermal stress caused upon soot combustion.

Example

Hereinafter, the present invention will be described in more detail on the basis of Examples. However, the present invention is by no means limited to these Examples.

Figure 7:
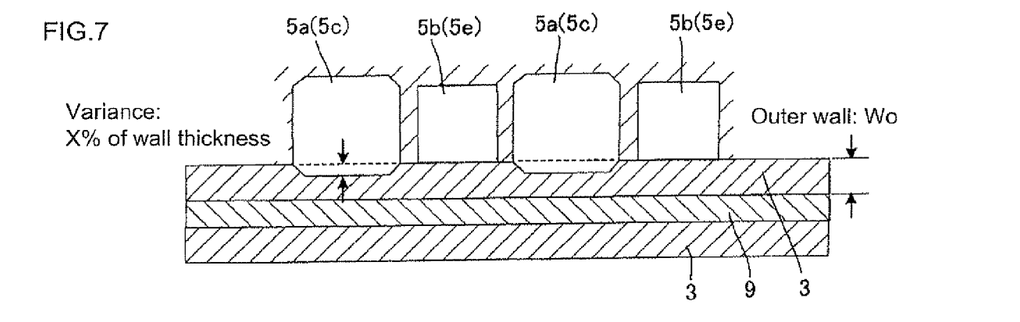
FIG. 7 is an explanatory view explaining a variance in thickness of the outer walls.
Figure 8:
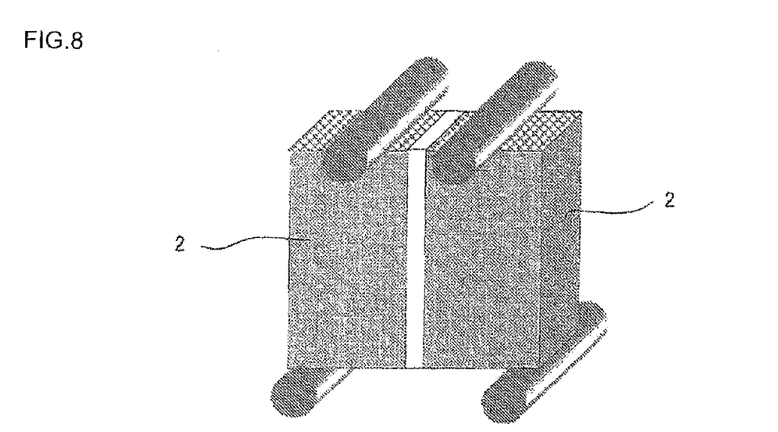
FIG. 8 is a view showing a method for measuring bonding strength.

The honeycomb segment of the aforementioned Type A is prepared, and, as shown in FIG. 7, the bonding strength of the honeycomb segment was checked from the degree of change of the outer wall (X % of the thickness of the outer wall (wall thickness)) with respect to the designed value (standard thickness) $W_0$. As shown in FIG. 8, the bonding strength was measured by four-point bending strength by preparing two honeycomb segments bonded together with a bonding material, supporting the honeycomb segments in the support portions, and applying pressure with an autograph so that stress was applied on the bonding portion.

Figure 9:
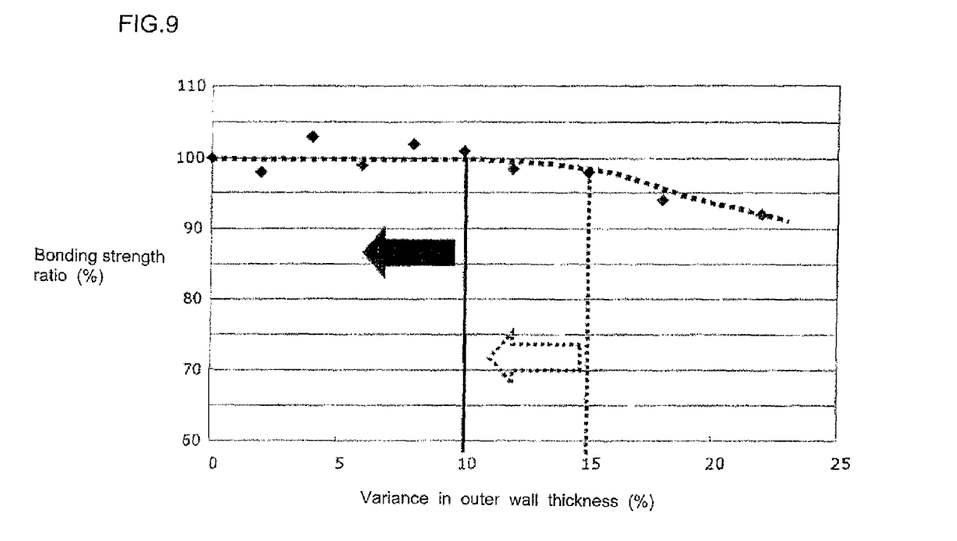
FIG. 9 is a graph showing a bonding strength ratio with respect to a variance in thickness of the outer walls.

The bonding strength ratio with respect to the variance in thickness is shown in FIG. 9. As shown in FIG. 9, when the variance in thickness exceeds 15%, the bonding strength is reduced. That is, when the variance in thickness is 15% or less, desirably 10% or less, the bonding strength is not reduced to obtain ideal bonding.

Figure 10:
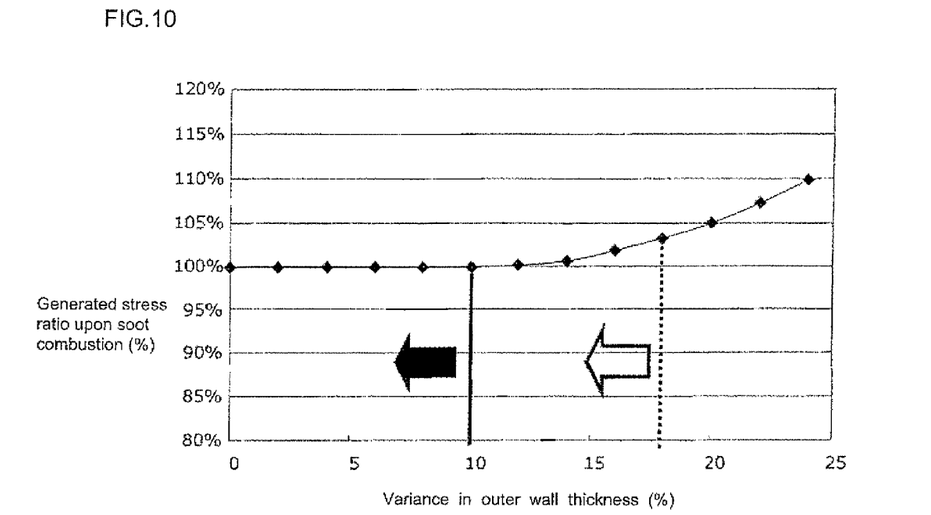
FIG. 10 is a graph showing stress caused upon regeneration with respect to a variance in thickness of the outer walls.
Figure 11:
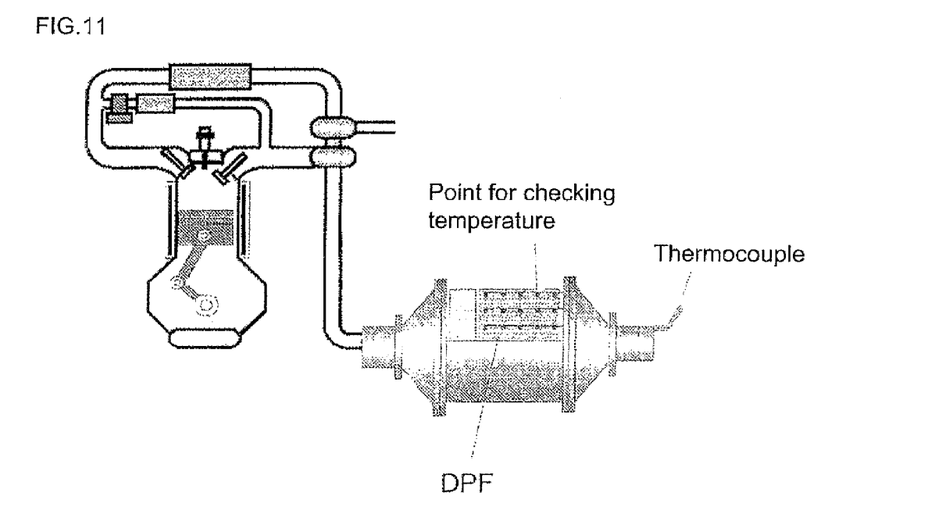
FIG. 11 is a schematic view of a regeneration test using a real engine.

FIG. 10 shows simulation results of generated stress upon soot combustion with respect to the variance in thickness of the outer walls. The simulation of the generated stress was calculated by the simulation using the temperature distribution obtained by measuring temperature distribution of a DPF upon soot combustion with a thermocouple using a real engine. The schematic view of the regeneration test using the real engine is shown in FIG. 11.

As shown in FIG. 10, when the variance in thickness is 18% or less, desirably 10% or less, crack generation stress upon regeneration is small.

As described above, by forming the outer walls linearly to have a uniform thickness except for the corner portions, the bonding width of the bonding material layer 9 upon bonding honeycomb segments 2 becomes constant to reduce a variance in pressure loss and a variance in a thermal stress absorption effect against local thermal stress caused upon soot combustion.

INDUSTRIAL APPLICABILITY

A honeycomb segment of the present invention can be used as a trapping filter for exhaust gas, for example, as a diesel particulate filter (DPF) for trapping and removing particulate matter (particulates) contained in exhaust gas from a diesel engine or the like.

The invention claimed is:

1. A honeycomb segment comprising outer walls and porous partition walls disposed inside the outer walls and separating and forming a plurality of cells functioning as fluid passages, the honeycomb segment having a structure where first cells each open in one end portion on one side and plugged in the other end portion on the other side and second cells each plugged in one end portion on one side and open in the other end portion on the other side are alternately disposed in such a manner that the fluid flowing in the first cells from the one end portion is permeated through the partition walls to flow out inside the second cells as a permeated fluid and that the permeated fluid can be discharged from the other end portion on the other side where the second cells are open;

wherein a cross-sectional area of the first cells in a cross section cut along a plane perpendicular to a longitudinal direction of the cells is larger than that of the second cells, and the first cells and the second cells are alternately disposed in a first direction and in a second direction perpendicular to the first direction in the cross section, a cell structure formed by the first cells and the second cells in an outermost peripheral portion is formed different from that in a central portion, and the second cells in the outermost peripheral portion are formed larger than the second cells in the central portion, and the outer walls are linearly formed so as to have a uniform thickness except for corner portions.

2. The honeycomb segment according to claim 1, wherein the first cells in the outermost peripheral portion are formed smaller than the first cells in the central portion.

3. The honeycomb segment according to claim 1, wherein a thickness of the outer wall is within ±15% of a standard thickness except for the corner portions.

4. The honeycomb segment according to claim 1, wherein a cross-sectional shape of inner peripheral faces of the outer walls in the cross section cut along the plane perpendicular to the longitudinal direction of the cells is square.

\* \* \* \* \*